(12) United States Patent
Bareis

(10) Patent No.: US 7,774,948 B1
(45) Date of Patent: Aug. 17, 2010

(54) UNIVERSAL DESIGN STRAIGHTEDGE

(76) Inventor: Kathryn M. Bareis, 4950 S. Lowes Creek Rd., Eau Claire, WI (US) 54701

( * ) Notice: Subject to any disclaimer, the term of this patent is extended or adjusted under 35 U.S.C. 154(b) by 0 days.

(21) Appl. No.: 11/950,558

(22) Filed: Dec. 5, 2007

Related U.S. Application Data

(60) Provisional application No. 60/868,886, filed on Dec. 6, 2006.

(51) Int. Cl.
  *B43L 7/00* (2006.01)
  *G01C 3/04* (2006.01)
  *G01C 3/10* (2006.01)
(52) U.S. Cl. .......................... 33/494; 33/483
(58) Field of Classification Search .......... 33/484, 33/494, 483, 487
  See application file for complete search history.

(56) References Cited

U.S. PATENT DOCUMENTS

| | | | | |
|---|---|---|---|---|
| 1,235,801 A * | 8/1917 | Hornig | | 33/494 |
| 1,417,878 A * | 5/1922 | Abare | | 33/495 |
| 1,732,906 A | 10/1929 | Morton | | |
| 2,642,674 A * | 6/1953 | Schell, Jr. | | 33/527 |
| 4,484,395 A * | 11/1984 | Samuels | | 33/494 |
| 5,191,716 A * | 3/1993 | Anderson | | 33/483 |
| 5,335,421 A * | 8/1994 | Jones, Jr. | | 33/494 |
| 5,615,488 A * | 4/1997 | Brady | | 33/484 |
| 5,632,095 A * | 5/1997 | Day | | 33/494 |
| 5,746,001 A | 5/1998 | Fisher | | |
| 5,881,469 A * | 3/1999 | Monck | | 33/494 |
| 5,913,586 A * | 6/1999 | Marshall | | 33/759 |
| 6,195,904 B1 * | 3/2001 | Greer | | 33/527 |
| RE37,212 E | 6/2001 | Marshall | | |
| 6,243,959 B1 | 6/2001 | Monck | | |
| 6,782,629 B2 | 8/2004 | Jimenez et al. | | |
| 6,813,841 B1 | 11/2004 | Ramsey | | |
| 7,043,850 B2 * | 5/2006 | Brady | | 33/562 |
| 7,076,881 B1 | 7/2006 | Perry | | |
| 7,100,295 B1 | 9/2006 | Chang | | |

* cited by examiner

*Primary Examiner*—Yaritza Guadalupe-McCall
(74) *Attorney, Agent, or Firm*—Anthony J. Bourget; Michael T. Hess

(57) ABSTRACT

A universal design straightedge comprising a body having a top surface and a perimeter bounded by at least one edge, the top surface comprising evenly spaced apart linear rulings perpendicularly disposed to and extending from the edge, some of the linear rulings corresponding to a unit of measure, and some of said linear rulings corresponding to a fraction of the unit of measure, and numerical indicia associated with substantially all of the rulings, substantially all of the numerical indicia substantially centered about a centerline of respective linear rulings, the numerical indicia oriented in standard upright reading position with respect to the edge where the straightedge is arranged with the edge in an underlying relation with respect to the numerical indicia. The numerical indicia associated with the linear rulings corresponding to a fraction of the unit of measure may include a composite of full and fractional numerical indicia. The straightedge may also include a handle projecting generally perpendicularly from the top surface, the handle having a height substantially greater than a thickness of the body.

6 Claims, 5 Drawing Sheets

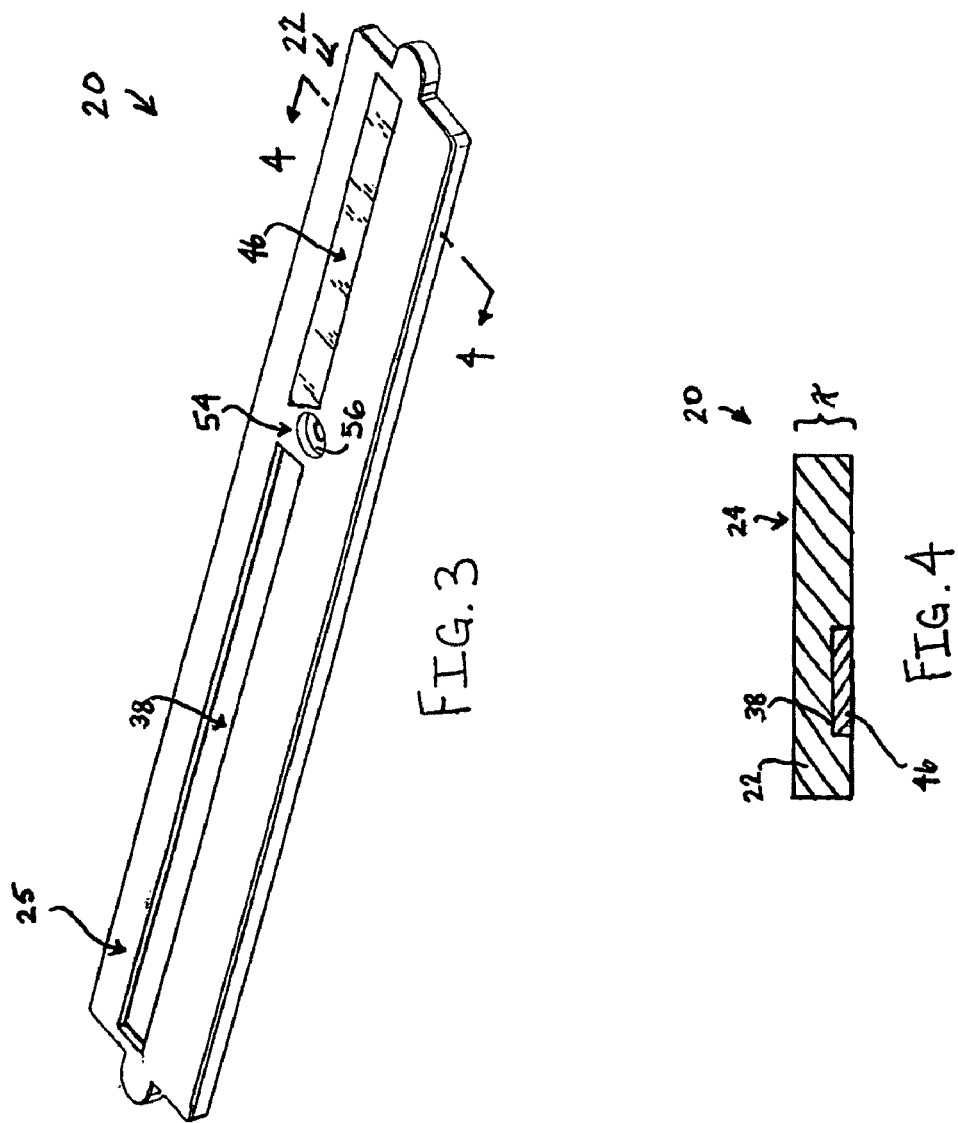

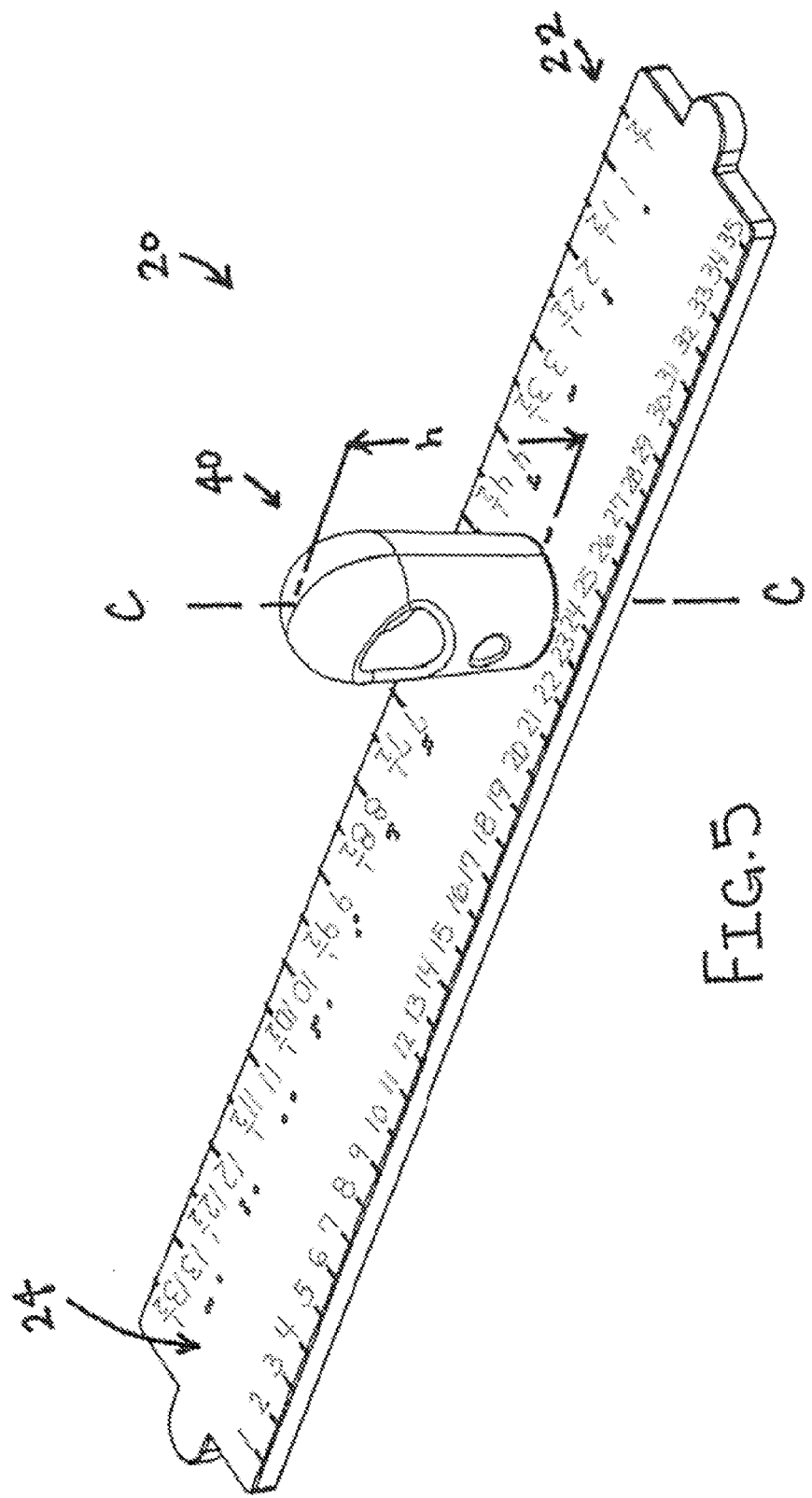

UNIVERSAL DESIGN STRAIGHTEDGE

CROSS-REFERENCE TO RELATED APPLICATIONS

Applicant claims priority based on Provisional Patent Application No. 60/868,886, filed Dec. 6, 2006, the entirety of which is incorporated herein by reference.

BACKGROUND OF THE INVENTION

1. Field of the Invention

The present invention relates generally to a straightedge and more particularly to an adaptive straightedge of universal design.

2. Background Information

Straight edges, rules, rulers, tape measures, and other items for marking or measuring have been around for ages. There have been a number of measuring and instructional devices containing ruler-type structures having markings with a variety of evenly spaced indicia representing particular units of measure. Often the units of measure or fractions thereof can be very confusing to the user of the device. The use of such devices is especially troublesome for young children or for persons with learning disabilities including those having physical and/or mental limitations. Sometimes using a measuring device is also troublesome for folks that do not present learning disabilities or physical or mental inabilities. While there have been numerous improvements and varieties of measuring devices created over the years, there is a need to create such devices that are understandable by all persons, together with a need of having a device that is of a universal design which is acceptable for common use by everyone.

A variety of inventions have been patented which pertain to the use of measuring and instructional rules or straight-edge devices. Some of those for which patents have been granted including the following: U.S. Pat. No. 5,746,001 to Fisher; U.S. Pat. No. 7,076,881 to Perry; U.S. Pat. No. 6,813,841 to Ramsey; U.S. Pat. No. RE37,212 to Marshall; U.S. Pat. No. 6,782,629 to Jimenez, et al.; U.S. Pat. No. 6,243,959 to Monck; U.S. Pat. No. 1,732,906 to Morton; and, U.S. Pat. No. 7,100,295 to Chang.

It is often the case that persons with learning difficulties including those with dyslexia or vision problems or general comprehension problems have difficulty following number line sequences or using, handling, or interpreting measuring devices, especially where such devices include fractional indicia. Such devices are also often difficult for people to manipulate, while at the same time aligning for a measuring, marking or cutting purpose.

The instructional ruler patented by Monck, U.S. Pat. No. 6,243,959, includes one measuring device. FIG. 6 of that patent shows a base having integer indicia with associated markings, yet does not include fractions which also contain associated indicia. When an overlaying material with gradations is included the user is still left confused as to the meaning of the particular gradations between the integers. The device shown in the patent by Fisher, U.S. Pat. No. 5,746,001, includes a measuring device having integer indicia together with indicia associated with fractional units. However, this device is still confusing to a user when compared to a device embodying the principles of applicant's invention as described below. Further, while some of the above patents and other devices include a variety of handles or features to assist in holding or manipulating a straightedge or ruler, such handles are generally awkward or require a particular grasping function and do not accommodate for a variety or multiple arrangements for griping or grasping. Accordingly, there is also a need for a product that has a workable handle that may be manipulated on a device which also includes indicia that are easy to comprehend.

SUMMARY OF THE INVENTION

The known measuring devices are not of a universal design straightedge that is easy for users to comprehend the related indicia and markings as well as easy to reconfigure or manipulate. Applicant has discovered that another source of confusion for persons reading or manipulating a straightedge is that when an edge from which the spaced apart rulings extend is oriented as the underlying edge for the indicia, such indicia are upside-down and confusing to a user. Moreover, this upside-down aspect is further troubling where there is a lack of a full composite integer and fractional numbers associated with the particular fractional markings. It is further confusing to a user where the numbers or fractional numbers are off-set from the linear markings of the straightedge. In accordance with the invention, then, a straightedge is provided with substantially all of the numerical indicia substantially centered about a centerline of respective linear rulings where the numerical indicia are oriented in standard upright reading position with respect to the edge where the straightedge is arranged with the edge in an underlying relation with respect to the numerical indicia. A device having the above-noted features would be a significant improvement to accommodate use for all users, and especially accommodate use for persons having difficulty comprehending or interpreting the markings.

In particular embodiments of the invention the linear rulings are evenly spaced apart and perpendicularly disposed to and extend from the edge. Further aspects include some of the linear rulings corresponding to a unit of measure, and some of the linear rulings corresponding to a fraction of the unit of measure. Also in particular embodiments, the body of the straightedge is substantially transparent and the numerical indicia increase in value from left to right when reading in standard upright position. Further, full fractional numerical indicia substantially centered upon linear markings is provided. A handle projecting generally perpendicularly from a top surface of the straightedge is also present.

In a further aspect, the present invention is directed toward a straightedge comprising a body having a top surface and a perimeter bounded by at least one edge, the top surface comprising evenly spaced apart linear rulings perpendicularly disposed to and extending from the edge, some of the linear rulings corresponding to a unit of measure, and some of the linear rulings corresponding to a fraction of the unit of measure; and numerical indicia associated with substantially all of the rulings, substantially all of the numerical indicia substantially centered about a centerline of respective linear rulings, the numerical indicia oriented in standard upright reading position with respect to the edge where the straightedge is arranged with the edge in an underlying relation with respect to the numerical indicia.

A further aspect of the invention includes a straightedge comprising a body having a top surface and a perimeter bounded by at least one edge, the top surface comprising evenly spaced apart linear rulings perpendicularly disposed to the edge, some of the linear rulings corresponding to a unit of measure, and some of said linear rulings corresponding to a fraction of the unit of measure; and numerical indicia associated with substantially all of the rulings, substantially all of the numerical indicia associated with the linear rulings corresponding to the fraction of the unit of measure include a composite of full and fractional numerical indicia.

A further aspect of the invention includes a straightedge comprising a body having a top surface and a perimeter bounded by at least one edge, the top surface including evenly spaced apart linear rulings perpendicularly disposed to the edge; and a handle projecting generally perpendicularly from the top surface, the handle having a height substantially greater than a thickness of the body.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 3 is a bottom perspective view of the straightedge of FIG. 1.

FIG. 4 is a section view taken along line 4-4 of FIG. 3.

FIG. 5 is a perspective view of a straightedge of a further embodiment of the present invention.

Figure 1:
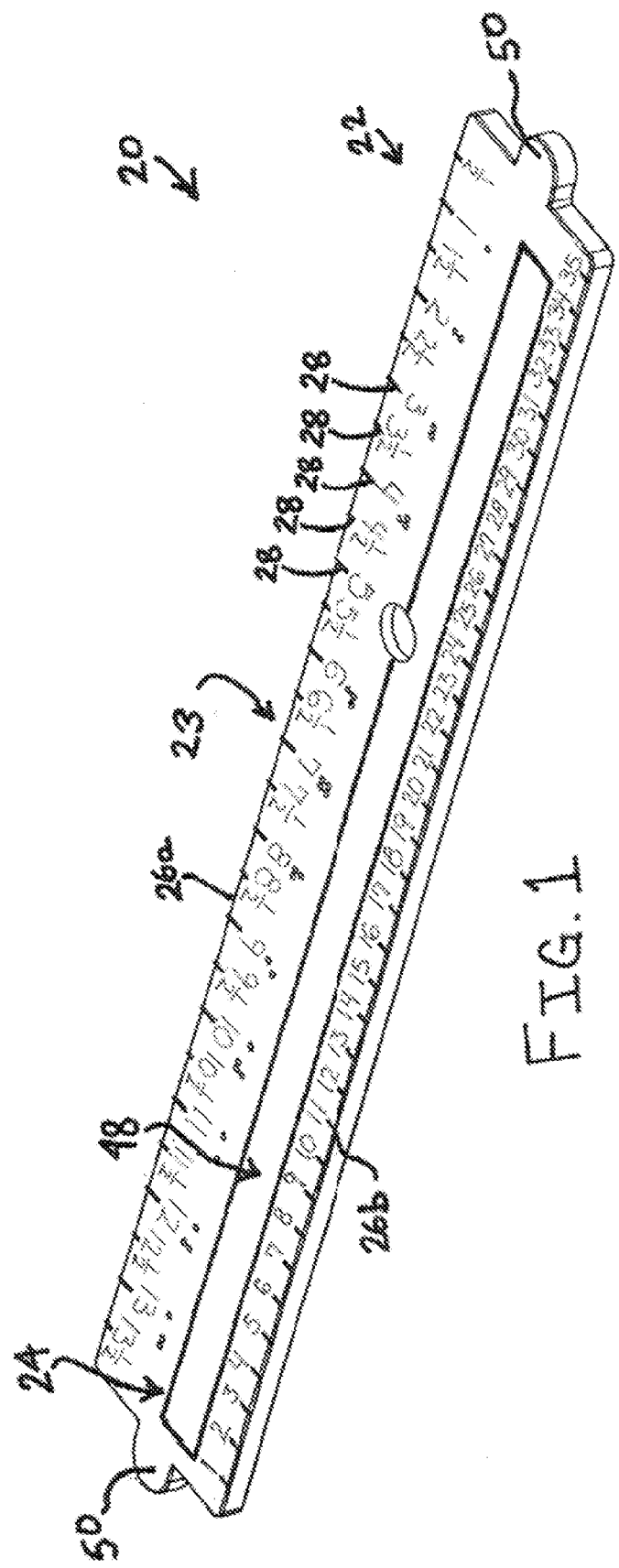
FIG. 1 is a perspective view of a straightedge of one embodiment of the present invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

Referring now to the Figures, a universal design straightedge according to the present invention is generally depicted with reference to numeral 20. In one aspect, straightedge or ruler 20 includes a body 22 having a top surface 24. Body 22 is preferably of rectangular shape. While body 22 may be made of or include a variety of materials, it is preferably made of flexible, clear, or substantially see-through plastic. Body 22 preferably has a shape of a common straightedge or ruler device. Straightedge 20 includes a perimeter 23. Body 22 includes at least one straightedge or edge 26, and preferably two edges 26a, 26b as is common with rulers. Preferably edge 26 is straight along its entire length, without interruption, projections or gaps.

Figure 2:
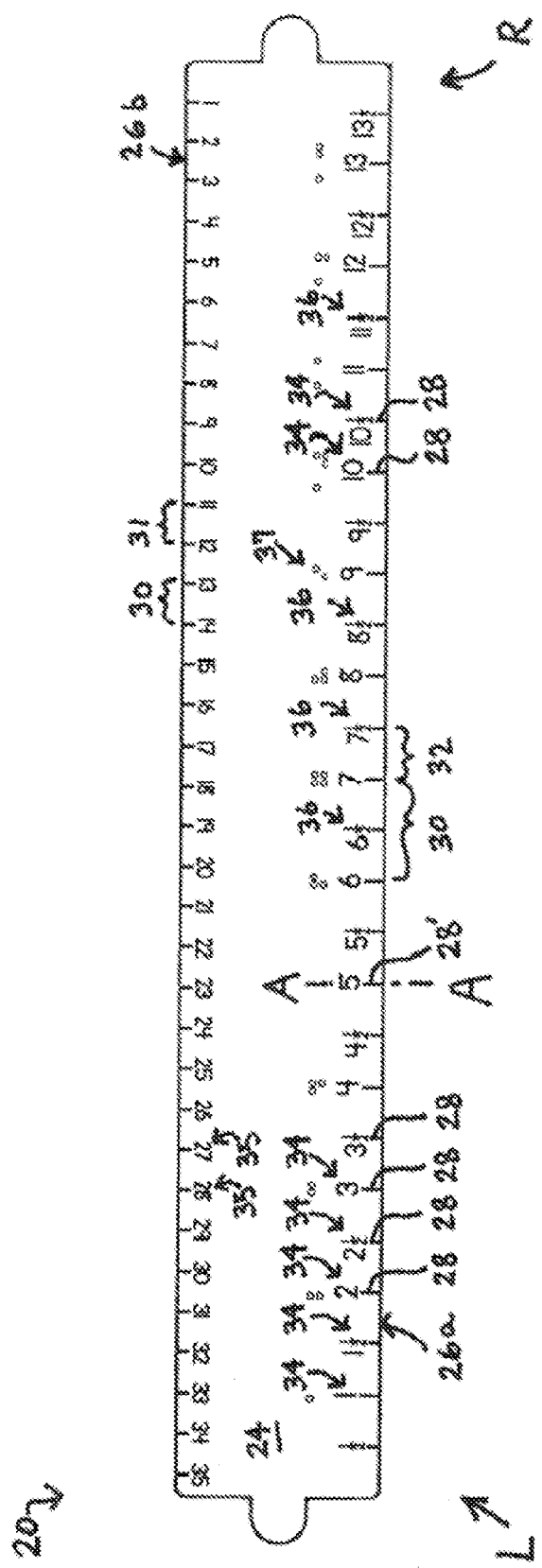
FIG. 2 is a plan view of the straightedge of FIG. 1.

As shown in FIG. 1 and FIG. 2, top surface 24 includes evenly spaced apart linear rulings 28. Rulings 28 are preferably perpendicularly disposed to and extend from edge 26. Preferably rulings 28 extend from edge 26a and edge 26b. Preferably a plurality of rulings 28 are provided as generally shown. At least some of the rulings 28 correspond to a unit of measure 30 and at least some of the rulings 28 correspond to a fraction of the unit of measure 32. Preferably the unit of measure 30 is an inch or is of English variety. It may be appreciated that the unit of measure 30 may also, or alternatively, include or correspond to a metric measure 31, such as a centimeter or the like. Preferably all rulings 28 correspond to a unit of measure 30 or a fraction of a unit of measure 32. It may be appreciated that rulings 28 extending from edge 26a preferably originate from edge 26a. It may be appreciated that while rulings 28 may nearly originate from edge 26a, rulings 28 preferably originate at edge 26a as shown. The terminology in the claims pertaining to rulings "extending from said edge" may be interpreted to include a relationship where the rulings 28, or some of them, originate or nearly originate at edge 26a.

Top surface 24 also includes numerical indicia 34. Preferably a plurality of indicia 34 are provided as generally shown. It may be appreciated that straightedge 20 may be of greater or lesser length having any desired number of rulings 28 and indicia 34. Preferably indicia 34 are associated with substantially all of the rulings 28, and more preferably each ruling 28 includes an associated indicia 34. Respective indicia 34 are associated with respective rulings 28, and preferably positioned adjacent respective rulings 28. More preferably, substantially all of indicia 34 are substantially centered about a centerline of respective rulings 28. As shown in FIG. 2, a representative numerical indicia "5" is associated with a ruling 28'. Ruling 28' defines a centerline generally along line A-A. Preferably the representative numeral "5" is centered along line A-A. It may be appreciated that such centered association makes the indicia-to-rulings representation easier to comprehend, understand or review as opposed to an association not so centered. Preferably each indicia-to-ruling association is centered. Preferably each ruling 28 includes an indicia 34. Preferably, indicia 34 include a font that is being taught to students in their respective schools or curricula. Most preferably, indicia 34 comprise a Zaner-Blozer font (for ease of understanding and importantly for use of the open "4" numeral). Other fonts such as a Danelian font which includes a "monkey tail" feature on the "a" character (useful for introducing students to cursive writing) may also be preferred.

As shown in FIG. 2, straightedge 20 is arranged with edge 26a in an underlying orientation with respect to numerical indicia 34. Particularly, indicia 34 are in a "standard upright reading position" with respect to edge 26a, as opposed to an upside-down viewing position. It may be appreciated that alternate numeric indicia 35, disposed opposite edge 26a, are in an upside-down reading position with respect to edge 26a. Edge 26a is thus in an underlying orientation with respect to indicia 34. It may be appreciated that orienting indicia 34 in a standard upright viewing position with respect to rulings extending from associated edge 26a makes for easier comprehension, understanding and review of the indicia 34. Preferably, numerical indicia 34 increase in value from left L to right R with each successive ruling 28 where straightedge 20 is arranged with edge 26a in an underlying orientation with respect to numerical indicia 34.

As further shown in FIG. 2, top surface 24 preferably includes numerical indicia 34 associated with linear rulings 28 corresponding to a fraction of unit measure 32. Preferably, such numerical indicia 34 include a composite of full and fractional numerical indicia 36. Preferably, composite indicia 36 include values such as 1½, 2½, 3½, 4½, 5½, 6½, 7½, 8½, 9½, 10½, 11½, 12½, and 13½, etc. While it may be appreciated that any number of composite indicia 36 may be used depending on the length of straightedge 20, preferably straightedge 20 includes at least composite indicia of at least 1½, 2½, 3½, and 4½. Preferably composite indicia 36 are centered about a centerline of respective linear rulings 28 as shown. Most preferably, the fractional component (including but not limited to "½") of composite 36 is centered about a centerline of ruling 28. It may be appreciated that such centerline alignment makes for easier comprehension, understanding and review of the indicia 34 and composite indicia 36. More particularly, having both the full and fractional components of the composite indicia 36 make comprehension of the associated value abundantly clear or at least assists persons who have difficulty distinguishing between fractional values located between full values or whole numbers. Otherwise, for instance, the value "½" lying between two whole numbers, such as between "8" and "9", might be interpreted by some individuals as either "8½" or "9½". With the subject invention, however, the value "8½" is expressly stated so there can be little if any uncertainty. Preferably, linear rulings 28 corresponding to a fractional unit of measure 32 have a length shorter than a length of linear rulings 28 corresponding to a unit of measure 30. Preferably indicia 34 associated with a fractional unit of measure 32 are positioned closer to edge 26a. Preferably top surface includes Braille characters 37 or values as shown. Character 37 is but one representation of such values, and in the case of character 37, represents the numerical value "9". Preferably rulings 28 and indicia 34 are raised from top surface 24 for a textured feature, or alternatively etched or recessed. Preferably rulings 28 and indicia 34 include a contrasting color as compared to top surface 24. Top surface 24 is preferably clear or transparent.

Preferably top surface 24 includes a textured area 48. Textured area 48 may include a buffed or blasted region of body 22, ideal for accepting markings of a pen, pencil or marker or the like. Area 48 allows for an instructor to place a mark adjacent a desired ruling 28 for instruction or guiding purposes. A typical area 48 may be formed by sand blasting or other scoring of top surface 24, and preferably creates an opaque region on surface 24.

Referring now to FIG. 3, straightedge 20 includes bottom surface 25. A groove 38 is preferably defined within surface 25. Preferably a metal strip 46 is positioned within groove 38. While groove 38 may be a rectangular area of varying dimension, it may be appreciated that other configurations are contemplated. It may also be appreciated that metal strip 46 may be of varying dimension as desired, and is preferably a metal strip as generally shown. Preferably metal strip 46 is a magnetic strip. It may be appreciated that magnet 46 is positioned within groove 38. It may be appreciated that a magnet 46 may also be positioned within groove 38. It may also be appreciated that groove 38 and a corresponding magnet may run the entire length, or substantially the entire length of straightedge 20. Preferably groove 38 includes a colored or painted layer (not shown) upon which strip 46 is positioned. A colored layer assist in concealing strip 46 from clear view and brightens straightedge 20 where use of a dark color strip or magnet 46 is required. A magnet is preferably used so that straightedge 20 may be held in place on a metal surface or object or other object or surface having a metal or magnet. Straightedge 20 having a magnet may also hold a sheet material placed between straightedge 20 and a surface. While not preferred, it may be appreciated that bottom surface 25 may also include a layer (not shown) covering the metal surface 46. Metal surface 46, while still being a bottom surface, may thus also be embedded within body 22.

Referring to FIG. 4, metal strip 46 is preferably off-set from a centerline of straightedge 20. Such off-set arrangement is useful where straightedge 20 is placed upon an object having a similar metal strip which may be magnetized so as to accommodate attraction between the respective strips.

Referring to FIG. 5, a further aspect of the invention is shown. Straightedge 20 includes a handle 40 positioned atop top surface 24. Handle 40 projects generally upward from top surface 24, and preferably handle 40 projects generally perpendicularly from top surface 24. Preferably handle 40 is off-set from a center point of top surface 24. Having such off-set feature accommodates for a desired flexing of body 22 where desired.

Figure 6:
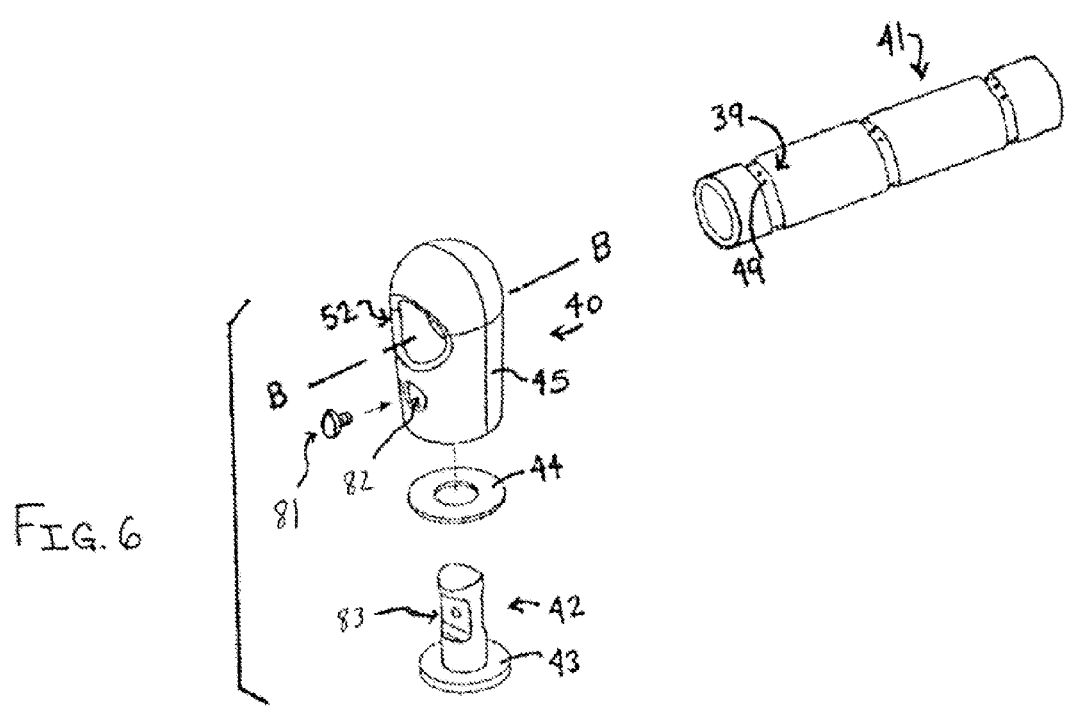
FIG. 6 is an exploded perspective view of a handle aspect of the present invention.

Preferably handle 40 is spinably connected to straightedge 20. Preferably handle 40 spins about a central axis C-C as shown in FIG. 5. Preferably handle 40 includes a base portion that is generally cylindrical or includes a slightly upward tapered cylindrical component. Preferably handle 40 includes a bore 52 having a central axis B-B aligned substantially parallel with top surface 24. Preferably handle 40 has a height "h" substantially greater than a thickness "x" of body 22. In one non-limiting example, as shown in FIG. 5, base 22 has thickness or about ¼ inch whereas handle 40 has a height of about 2 inches. Preferably handle has height at least twice the measure of thickness "x", and more preferably greater than four times the measure of thickness "x". Such dimensions enhance the usefulness of handle 40 so an individual may use a variety of grips or grasps when manipulating straightedge 20. Preferably handle 40 includes T-bar 41 which inserts within bore 52. T-bar 40 may be inserted at a midpoint of as shown or off-set to accommodate a desired grasp. T-bar preferably includes grooves with nubs or tabs to engage a corresponding tab within bore 52 to secure T-bar 41 in position. As handle 40 is swiveled, bore 52 is realigned, thus accommodating a variety of grasping arrangements for T-bar 41. As shown in FIG. 6, a post 42 having lip 43 may be inserted within aperture 54 (see FIG. 3) to receive handle 40. Preferably lip 43 abuts a shelf 56 within aperture 54 where remainder of post 42 extends therethrough. Preferably a spacer 44 or washer is included to accommodate for spin of handle about axis C-C. A set screw 81 or other fastener may be used to secure handle 40 to post 42. In one aspect set screw 81 enters port 82 within handle 40 and further enters post 42 at post port 83 (See FIG. 6) to secure handle 40 to post 42. Fastener 81 aligns generally perpendicular to post 42. It may be appreciated that other mechanisms for affixing handle 40 to straightedge 20 may be used without departing from the invention.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A straightedge comprising:
   a body having a top surface and a perimeter bounded by at least one edge, said top surface including evenly spaced apart linear rulings perpendicularly disposed to said edge; and
   a handle having a base portion fastened to a post and said handle is projecting generally upward from said top surface, said handle including a bore having a central axis aligned substantially parallel with said top surface, said handle having a height substantially greater than a thickness of said body;
   a fastener connects said base portion and said post, said fastener is a set screw aligned generally perpendicular to said post, and
   where said handle swivels about a longitudinal axis of said base portion.

2. The straightedge of claim 1 wherein said handle projects generally perpendicularly from said top surface and includes said base portion swivably affixed to said top surface at a position offset from a centerpoint of said top surface.

3. The straightedge of claim 1 wherein said body includes a magnet positioned opposite said top surface.

4. A straightedge comprising:
- a body having a top surface and a perimeter bounded by at least one edge, said top surface comprising:
- evenly spaced apart linear rulings perpendicularly disposed to said edge, some of said linear rulings corresponding to a unit of measure, and some of said linear rulings corresponding to a fraction of the unit of measure;
- numerical indicia associated with substantially all of said rulings, substantially all of said numerical indicia associated with said linear rulings corresponding to the fraction of the unit of measure include a mixed number; and
- a handle, said handle projecting generally upward from said top surface, and
- where said handle has a height substantially greater than a thickness of said body, and wherein said handle includes a bore capable of receiving a t-bar.

5. The straightedge of claim 4 where bore has a central axis aligned substantially parallel with said top surface.

6. A straightedge comprising:
- a body having a top surface and a perimeter bounded by at least one edge, said top surface comprising:
- evenly spaced apart linear rulings perpendicularly disposed to said edge, some of said linear rulings corresponding to a unit of measure, and some of said linear rulings corresponding to a fraction of the unit of measure; and
- numerical indicia associated with substantially all of said rulings; and
- an elongated groove extending partially through said body and positioned opposite said top surface, said groove contains an elongated magnet and is treated with a color layer.

\* \* \* \* \*